(12) United States Patent
Sundararaj et al.

(10) Patent No.: US 10,589,872 B1
(45) Date of Patent: Mar. 17, 2020

(54) AUGMENTED WEIGHT SENSING FOR AIRCRAFT CARGO HANDLING SYSTEMS

(71) Applicant: Rockwell Collins, Inc., Cedar Rapids, IA (US)

(72) Inventors: Laveen Vikram Sundararaj, Hyderabad (IN); Vikramasimha Reddy Patanna, Hyderabad (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/261,132

(22) Filed: Jan. 29, 2019

(51) Int. Cl.
| B64D 45/00 | (2006.01) |
| G01G 19/62 | (2006.01) |
| G01G 19/414 | (2006.01) |
| B64D 9/00 | (2006.01) |

(52) U.S. Cl.
CPC ............. B64D 45/00 (2013.01); B64D 9/00 (2013.01); G01G 19/414 (2013.01); G01G 19/62 (2013.01)

(58) Field of Classification Search
CPC ........ B64D 45/00; B64D 9/00; G01G 19/414; G01G 19/62
See application file for complete search history.

(56) References Cited

U.S. PATENT DOCUMENTS

| 7,305,324 | B2 * | 12/2007 | Beshears | ............... | G01G 19/02 |
| | | | | | 702/173 |
| 8,622,298 | B2 * | 1/2014 | Huber | .................... | G06Q 10/08 |
| | | | | | 235/451 |
| 9,927,319 | B2 * | 3/2018 | Nance | .................... | G01M 1/125 |
| 10,210,473 | B2 * | 2/2019 | Arora | ..................... | G01G 19/40 |
| 2006/0111868 | A1 * | 5/2006 | Beshears | ............... | G01G 19/02 |
| | | | | | 702/173 |
| 2011/0313563 | A1 * | 12/2011 | Huber | .................... | G06Q 10/08 |
| | | | | | 700/214 |
| 2014/0097297 | A1 * | 4/2014 | Yanagawa | ................ | B64D 9/00 |
| | | | | | 244/137.1 |

(Continued)

OTHER PUBLICATIONS

"U.S. Cargo Military Technology", Printed Jan. 29, 2019, 1 page, https://www.uscargosystems.com/military-cargo-landling-products/.

(Continued)

*Primary Examiner* — Joseph H Feild
*Assistant Examiner* — Rufus C Point
(74) *Attorney, Agent, or Firm* — Suiter Swantz pc llo

(57) ABSTRACT

An aircraft cargo handling system with augmented weight sensing capability is disclosed. In embodiments, the aircraft cargo handling system includes a loadmaster control station including a controller with a user interface communicatively coupled to the controller. The user interface is configured to receive user-input weight data for one or more cargo units. The aircraft cargo handling system further includes one or more sensors configured to detect weight data for the cargo units or one or more carriers for the cargo units. The sensors may be coupled to respective transmitters that are configured to transmit the detected weight data to a data gateway device that is communicatively coupled to the controller. The controller is configured to compare the user-input weight data to the detected weight data and generate an alert when the difference between the user-input weight data and the detected weight data is greater than a threshold weight difference.

20 Claims, 10 Drawing Sheets

(56) References Cited

U.S. PATENT DOCUMENTS

| | | | | |
|---|---|---|---|---|
| 2015/0254604 | A1* | 9/2015 | Arora | G01G 19/40 705/332 |
| 2015/0344979 | A1* | 12/2015 | Hein | G06Q 30/0621 8/94.15 |
| 2016/0356641 | A1* | 12/2016 | Larson | H04W 4/70 |

OTHER PUBLICATIONS

Leonardo DRS, "Cargo Handling & Aerial Delivery Systems", Printed Jan. 29, 2019, 2 pages, http://www.leonardodrs.com/products-and-services/fixed-wing-onboard-cargo-handling-aerial-delivery-systems/.

KWD Manufacturing Inc., "Cargo Handling System", Printed Jan. 29, 2019, 2 pages, http://www.kwdmfg.com/products/455-000-c-130-cargo-handling-system/.

Willis, Tom et al., "ULDs start to get smart", Cargo Airports & Airline Services, Autumn 2017, pp. 50-53, http://www.unilode.com/wp-content/uploads/2017/11/Cargo-Airports-Airline-Services_Autumn-2017_Unilode-interview_Floris-Kleijn.pdf.

Accelya, The Future of ULD Management in a Digital World, Sep. 28, 2017, 3 pages, https://w3.accelya.com/blog/the-future-of-uld-management-in-a-digital-world.

TCS 50 Experience Energy, TATA Consultancy Services, "Cargotec aims to leverage digital services to transform cargo handling operations", Printed Jan. 29, 2019, 4 pages, https://www.tcs.com/cargo-tech-iot-platform-for-digital-services.

Lacey, Matthew et al., "Shipping smarter: IoT opportunities in transport and logitstics", Sep. 15, 2015, 9 pages, https://www2.deloitte.com/insights/us/en/focus/internet-of-thingshot-in-shipping-industry.html.

* cited by examiner

US 10,589,872 B1

AUGMENTED WEIGHT SENSING FOR AIRCRAFT CARGO HANDLING SYSTEMS

BACKGROUND

Cargo handling aerial delivery control system (CHADCS) systems may lack mechanisms to verify cargo weight that is manually entered by a loadmaster. For example, the loadmaster may need to rely on weight details that are provided to him/her. When there is no way to verify that the weights entered by the loadmaster indeed match with the cargo that has been loaded into or released from the aircraft, this leaves too much opportunity for human error.

There have been instances where cargo weight exceeded the threshold due to overlook by humans and due to absence of physical verification by the onboard cargo handling systems. This can result in incidents ranging from near misses to fatalities. To avoid such incidents, there is a need for improved technologies that enable cargo weight to be monitored more effectively in aircraft cargo handling systems.

SUMMARY

In an aspect, embodiments of the inventive concepts disclosed herein are directed to an aircraft cargo handling system with augmented weight sensing capability. In embodiments, the aircraft cargo handling system includes a loadmaster control station including a controller with a user interface communicatively coupled to the controller. The user interface is configured to receive user-input weight data for one or more cargo units. The aircraft cargo handling system further includes one or more sensors configured to detect weight data for the cargo units or one or more carriers for the cargo units. The sensors may be coupled to respective transmitters that are configured to transmit the detected weight data to a data gateway device that is communicatively coupled to the controller. The controller is configured to receive the user-input weight data from the user interface and the detected weight data from the data gateway device. The controller is further configured to compare the user-input weight data to the detected weight data and generate an alert when the difference between the user-input weight data and the detected weight data is greater than a threshold weight difference.

In another aspect, embodiments of the inventive concepts disclosed herein are directed to a loadmaster control station. In embodiments, the loadmaster control station includes a controller, a user interface, and a data gateway device. The user interface is communicatively coupled to the controller and configured to receive user-input weight data for one or more cargo units. The data gateway device is also communicatively coupled to the controller. The data gateway device can be configured to receive weight data detected by one or more sensors coupled to the one or more cargo units or to one or more carriers for the one or more cargo units. The controller is configured to receive the user-input weight data from the user interface and the detected weight data from the data gateway device. The controller is further configured to compare the user-input weight data to the detected weight data and generate an alert when the difference between the user-input weight data and the detected weight data is greater than a threshold weight difference.

In another aspect, implementations of the inventive concepts disclosed herein are directed to a method for monitoring aircraft cargo. In implementations, the method includes: receiving user-input weight data for one or more cargo units via a user interface; receiving weight data detected by one or more sensors coupled to the one or more cargo units or to one or more carriers for the one or more cargo units; comparing the user-input weight data to the detected weight data; and generating an alert when a difference between the user-input weight data and the detected weight data is greater than a threshold weight difference.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
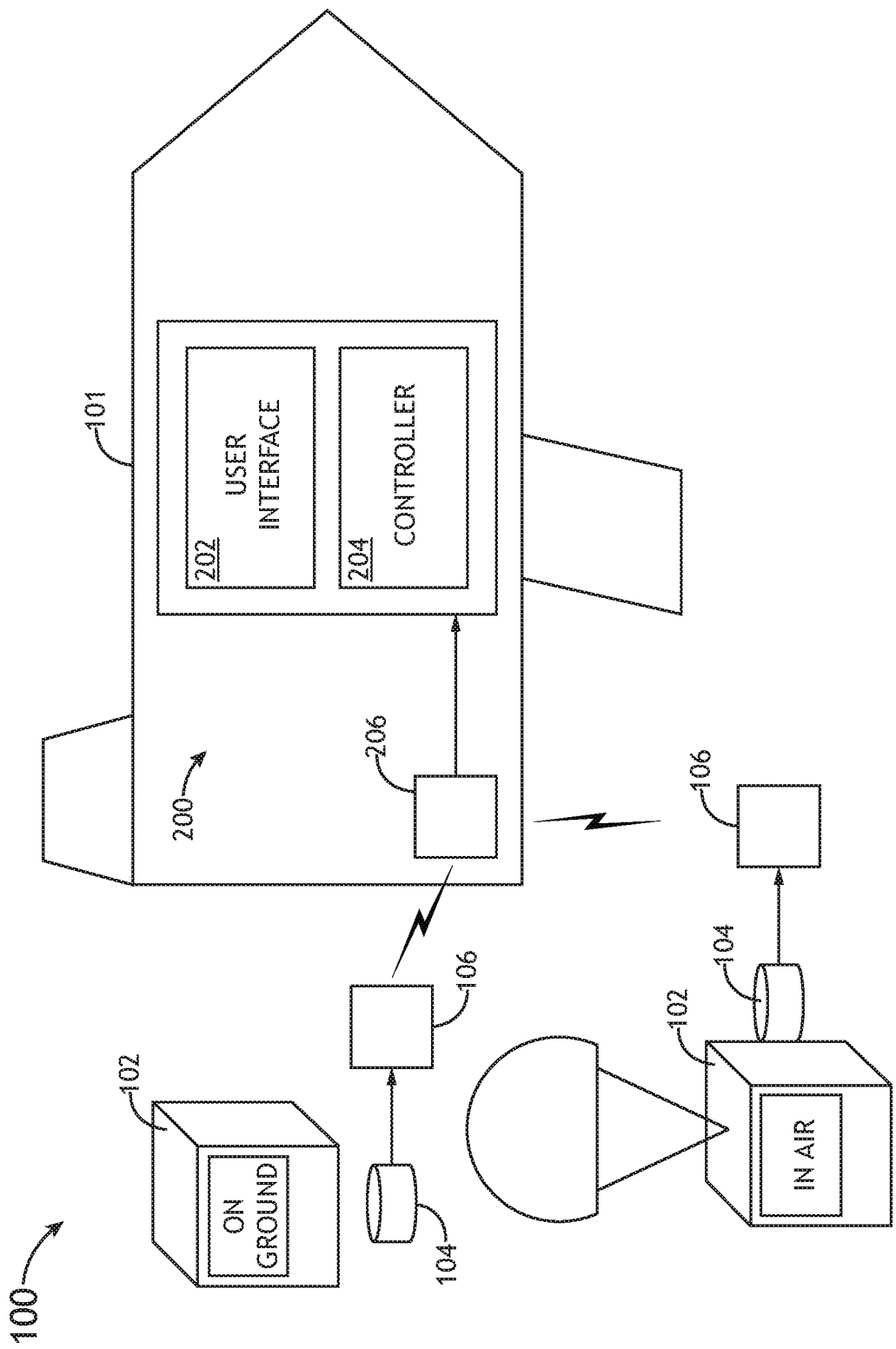
FIG. 1 is a block diagram illustrating an aircraft cargo handling system with augmented weight sensing capability, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an aircraft cargo handling system with augmented weight sensing capability. Cargo handling aerial delivery control system (CHADCS) systems may lack mechanisms to verify cargo weight that is manually entered by a loadmaster. For example, the loadmaster may need to rely on weight details that are provided to him/her. When there is no way to verify that the weights entered by the loadmaster indeed match with the cargo that has been loaded into or released from the aircraft, this leaves too much opportunity for human error. Accordingly, an aircraft cargo handling system with augmented weight sensing capability is disclosed.

Features of the disclosed aircraft cargo handling system may include, but are not limited to: (1) automated methods for augmenting the accuracy of weight estimation/entries that are manually entered into the Loadmaster Control Station (LCS) (e.g., via the Cargo Handling Control Application (CHCA), the Cargo Handling Planning Station (CHPS), or interfacing with the Mission Computer); (2) universal gateway that facilitates input of weight and other detected parameters/data into the LCS; (3) the gateway can be used not only when cargo units/carriers are on ground, but in air and after a cargo unit/carrier is released out of the aircraft; (4) modified LCS software application that monitors/compares weight and/or position information of cargo units for enhanced safety/accuracy; (5) cargo units/carriers with internet of things (IoT) devices (e.g., internet-connected communication units) attached to them that can communicate with LCS in real time through the gateway; (6) sensors/readers that can transmit weight and/or position information to the LCS through the gateway; (7) extraneous methods of sensing weight/position information of cargo units/carriers by using on-ground sensors or sensors attached to ground equipment (e.g., cargo handling equipment, pushback tractor, etc.), aircraft components (e.g., propulsion system, brakes, etc.), or the like; (8) ability to monitor cargo units even after they are released out of the aircraft; (9) ability to use gathered Information for refining loading, dropping, and/or landing accuracy; and (10) ability to adapt the system architecture for autonomous loading and unloading applications.

Referring now to FIGS. 1 through 7, an aircraft cargo handling system 100 is described in accordance with example embodiments of this disclosure. As shown in FIG. 1, the aircraft cargo handling system 100 includes a LCS 200, which may be onboard an aircraft 101. The LCS 200 may include a controller 204 with a user interface 202 communicatively coupled to the controller 204. The user interface 202 may be configured to receive user-input weight data for one or more cargo units 102. For example, the loadmaster may enter weight data for the one or more cargo units 102 via the user interface 202 (e.g., using a CHCA running on the controller 204). In other embodiments, the weight data may be uploaded from a server or another device. For example, the weight data may be uploaded to the LCS 200 from a CHPS or by interfacing with a Mission Computer.

Figure 2:
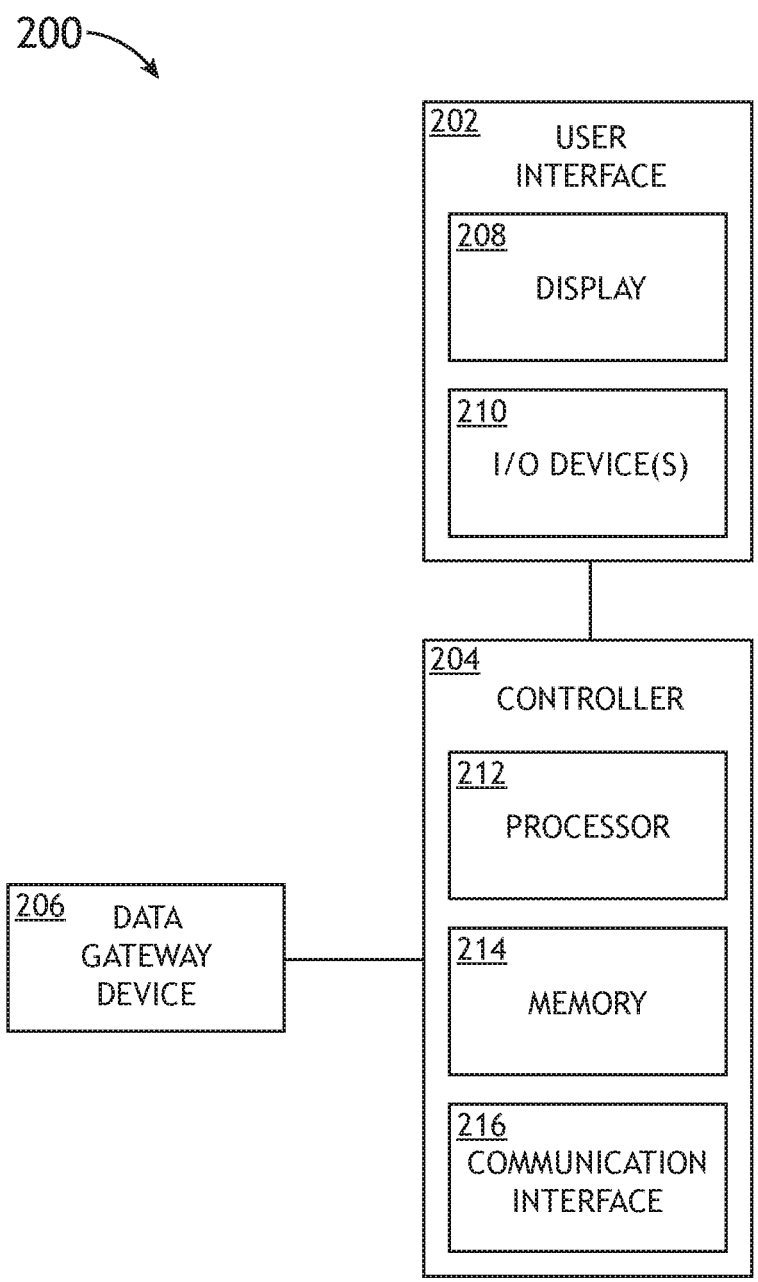
FIG. 2 is a block diagram illustrating a loadmaster control station of the aircraft cargo handling system illustrated in FIG. 1, in accordance with example embodiments of this disclosure.

Referring now to FIG. 2, the user interface 202 may include a display 208 (e.g., a light-emitting diode (LED) display, a liquid-crystal display (LCD), or any other type of display). The user interface 202 can also include one or more input/output (I/O) devices 210 (e.g., a keyboard, keypad, touchpad, touchscreen, touch panel, mouse, microphone, any combination thereof, or the like). In some embodiments, the display 208 is a touchscreen/touch panel display. In this regard, the display 208 itself may comprise an I/O device 210.

In embodiments, the LCS controller 204 includes at least one processor 212, memory 214, and a communication interface 216. The processor 212 provides processing functionality for at least the controller 204 and can include any number of processors, micro-controllers, circuitry, field programmable gate array (FPGA) or other processing systems, and resident or external memory for storing data, executable code, and other information accessed or generated by the controller 204. The processor 212 can execute one or more software programs (e.g., a LCS application) embodied in a non-transitory computer readable medium (e.g., memory 214) that implement techniques described herein. The processor 212 is not limited by the materials from which it is formed or the processing mechanisms employed therein and, as such, can be implemented via semiconductor(s) and/or transistors (e.g., using electronic integrated circuit (IC) components), and so forth.

The memory 214 can be an example of tangible, computer-readable storage medium that provides storage functionality to store various data and/or program code associated with operation of the controller 204/processor 212, such as software programs and/or code segments, or other data to instruct the processor 212, and possibly other components of the controller 204, to perform the functionality described herein. Thus, the memory 214 can store data, such as a program of instructions for operating the controller 204, including its components (e.g., processor 212, communication interface 216, etc.), and so forth. It should be noted that while a single memory 214 is described, a wide variety of types and combinations of memory (e.g., tangible, non-transitory memory) can be employed. The memory 214 can be integral with the processor 212, can comprise stand-alone memory, or can be a combination of both. Some examples of the memory 214 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 216 can be operatively configured to communicate with components of the controller 204. For example, the communication interface 216 can be configured to retrieve data from the processor 212 or other devices (e.g., user interface 202, data gateway device 206, etc.), transmit data for storage in the memory 214, retrieve data from storage in the memory 214, and so forth. The communication interface 216 can also be communicatively coupled with the processor 212 to facilitate data transfer between components of the controller 204 and the processor 212. It should be noted that while the communication interface 216 is described as a component of the controller 204, one or more components of the communication interface 216 can be implemented as external components communicatively coupled to the controller 204 via a wired and/or wireless connection. The controller 204 can also include and/or connect to one or more input/output (I/O) devices (e.g., via the communication interface 216), such as one or more sensors, an output device (e.g., computer display(s), speaker(s), etc.), an input device (e.g., a mouse, a trackball, a trackpad, a joystick, a touchpad, a touchscreen, a keyboard, a keypad, a microphone (e.g., for voice commands)), and so forth. In embodiments, the communication interface 216 includes or is coupled to a transmitter, receiver, transceiver, physical connection interface, or any combination thereof.

Referring again to FIG. 1, the aircraft cargo handling system 100 further includes one or more sensors 104 configured to detect weight data for the cargo units 102. In some embodiments, the one or more sensors 104 (e.g., force sensors 302 (e.g., weight/pressure sensors or gauges), torque/throttle sensors 402, imaging devices 502 (e.g., scanners or cameras), radio frequency sensors 602 (e.g., radio frequency identification (RFID) readers), slip sensors, any combination thereof, or the like) are configured to measure weight data (e.g., by sensing weight directly or indirectly applying physics to calculate weight based on other parameters (e.g., torque, throttle, slip angle, etc.)) or read weight data from a suitable medium (e.g., via image or pattern recognition, RFID detection, or the like). In some embodiments, the weight data is collected in real time or near real time. In other embodiments, the weight data is detected or predetermined ahead of time and then retrieved for use based on one or more identifiers associated with respective cargo units 102 (e.g., using a look up table, database, etc.).

The one or more sensors 104 may be coupled to respective transmitters 106 that are configured to transmit the detected weight data to a data gateway device 206 (e.g., a secure router, switch, or the like) that is communicatively coupled to the LCS 200 (e.g., to the controller 204). For example, a sensor 104 or group of sensors 104 may be coupled to a communication unit 106 (e.g., transmitter/transceiver) that is configured to communicate with the data gateway device 206. For example, the communication unit 106 may be configured to transmit communication signals (e.g., including detected weight data) to the data gateway device 206. In some embodiments, the communication unit 106 may be further configured to receive communication signals (e.g., including requests for data) from the data gateway device 206.

The data gateway device 206 may interface with multiple devices/sensors to input data into the aircraft cargo handling system 100 (e.g., into the LCS 200). For example, the data gateway device can be configured to receive input communications (e.g., from one or more communication units 106) via wireless (e.g., radio frequency (RF) or optical) connection, wired (e.g., physical) connection, or any other communicative coupling.

In some embodiments, the data gateway device 206 can be used to receive weight data and/or position data from cargo units 102 in the air, for example, while the aircraft 101 is airborne and/or after one or more of the cargo units 102 have been released (e.g., dropped) from the aircraft 101. For example, a communication unit 106 may be coupled to one or more sensors 104 that are attached to a cargo unit 102 and configured to communicate weight data, position data, and/or other information to the data gateway device 206 via a wireless (e.g., intranet/internet) connection between the communication unit 106 and the data gateway device 206. In some embodiments, the communication unit 106 and the data gateway device 206 are IoT devices in the sense that they are both connected to the internet and configured to communicate over secure internet protocols. An ability to maintain communication between the LCS 200 and cargo units 102 allows the LCS 200 to maintain current information on the weight and geographical location of the cargo units 102 in the cargo area of the aircraft 101. Furthermore, in embodiments where the communication unit 106 is configured to transmit detected weight data and/or position data even after the associated cargo unit 102 has been released from the aircraft 101, this information can be used to confirm that the intended cargo unit 102 has indeed been released and that its corresponding weight is considered for onboard weight computations.

In further implementations, the data gateway 206 may be configured as or integrated with a "Connected Cargo" system. In this regard, it is contemplated that the equipment, systems and people in the cargo handling ecosystem may be connected using IoT devices. Operations including, but not limited to, mission planning, loading, unloading, accuracy of drops, refining trajectory, and inventory management may be automated and monitored in hard/soft real time. The collected data may provide useful analytics that help improve efficiency of the aircraft cargo handling systems. Optimizing system efficiency by connecting all the players may facilitate savings on fuel, time, distance, insurance, manpower reduction, reduced wear and tear, logistics optimization, and so forth.

The LCS controller 204 is configured to receive user-input weight data via the user interface 202, or the weight data may be uploaded from a server or another device (e.g., from a CHPS or by interfacing with a Mission Computer). Additional confirmation of the user-input weight data is received via the data gateway device 206. For example, the LCS controller 204 is configured to receive detected weight data from the data gateway device 206. In a direct approach, a weight sensor, force gauge, throttle/torque sensor, or the like that is attached to cargo units 102, aircraft 101 or ground equipment measures may transmit detected weight data to the data gateway device 206 through a communication unit 106. In an indirect approach, the weight of the cargo units 102 is measured by appropriate infrastructure (e.g., weight scale, force sensors, etc.) beforehand and labeled by an identifier (e.g., Quick Response (QR) code, barcode, RFID tag, etc.) that is read by an appropriate device (e.g., camera, scanner, RFID reader, etc.) and transmitted to the data gateway device 206 through a communication unit 106. In embodiments, the data gateway device 206 takes in this information and transfers the data to the LCS controller 204 (e.g., through a data bus, network connection, or the like). The LCS controller 204 can then compare the detected weight data with the user-input weight data, and when the difference between the user-input weight data and the detected weight data exceeds a certain threshold, the LCS controller 204 may be configured to generate an alert. For example, the LCS controller 204 may flag the associated cargo units 102 and generate an alert/warning message at the display 208 or another user interface device (e.g., a speaker, indicator light, mobile device, etc.) for further action by crew.

Various example embodiments of sensors 104 configured to interface with the data gateway device 206 are illustrated in FIGS. 3 through 7 and described below. The one or more sensors 104 may include any sensor configuration and/or combination of sensors 104 and configurations illustrated in FIGS. 3 through 7. In this regard, the sensors 104 may include, but are not limited to, force sensors 302, torque/throttle sensors 402, imaging devices 502, RFID readers 602, position sensors 702, or any combination thereof.

Figure 3:
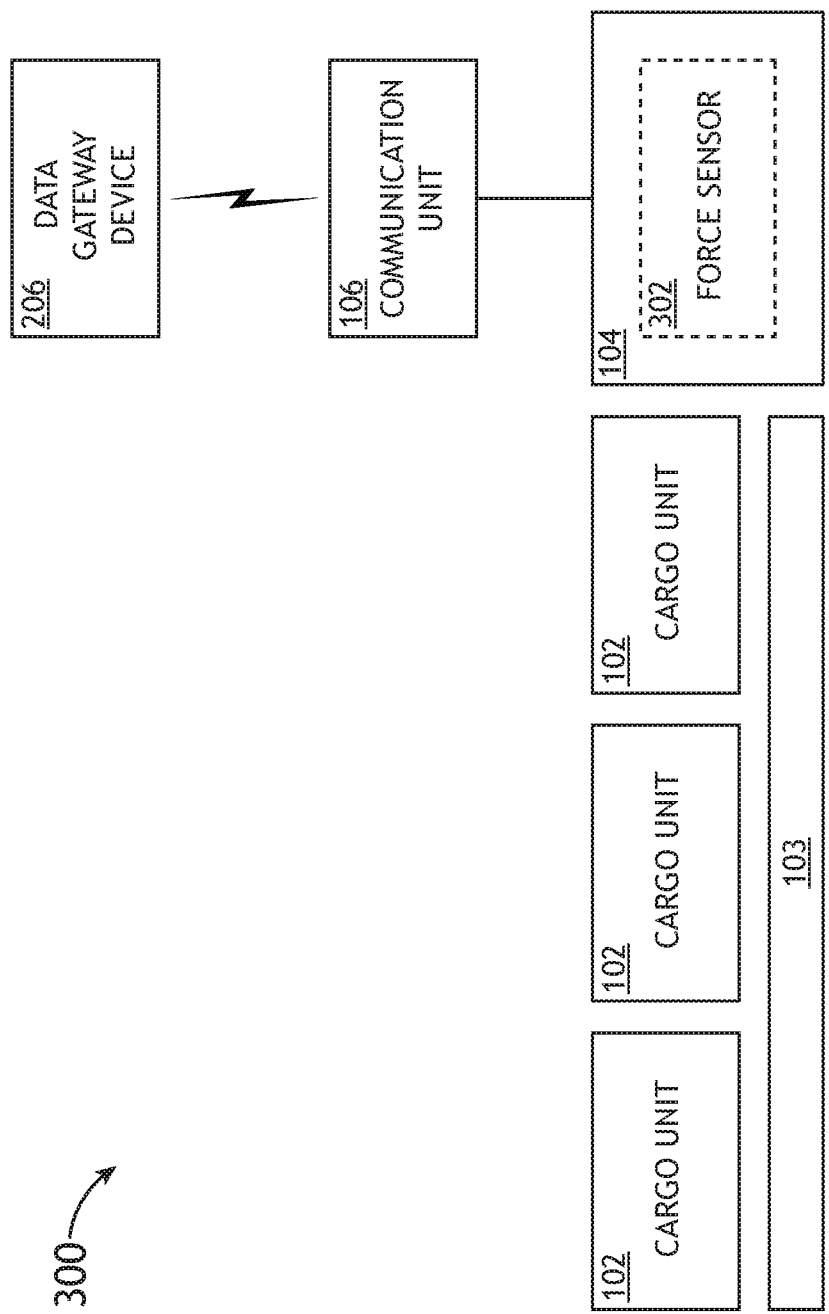
FIG. 3 is a block diagram illustrating a sensor configuration of the aircraft cargo handling system illustrated in FIG. 1, including one or more force sensors, in accordance with example embodiments of this disclosure.

In some embodiments, the system 100 may include a sensor configuration 300 illustrated in FIG. 3. In this regard, the one or more sensors 104 may include one or more force sensors 302 configured to detect one or more weights associated with the one or more cargo units 102. For example, the one or more force sensors 302 may be coupled to the one or more cargo units 102 (e.g., disposed within or attached to a bottom of each cargo unit 102). Alternatively, the one or more force sensors 302 may be coupled to one or more carriers 103 for the one or more cargo units 102. For example, individual cargo units 102 or groups of cargo units 102 may be disposed upon respective carriers 103 (e.g., crates, pallets, or the like) with one or more force sensors 302 configured to detect weight of the cargo units 102 or combined weight of the cargo units 102 and their respective carriers 103. In some embodiments, one or more force sensors 302 can alternatively or additionally be disposed at a weighing platform or in the aircraft 101 cargo area.

A communication unit 106 (including a transmitter/transceiver) is coupled to each force sensor 302 or group of force sensors 302 and is configured to transmit the detected weight data for the one or more cargo units 102 to the data gateway device 206. The data gateway device 206 then transmits the weight data detected by the one or more force sensors 302 to the LCS controller 204. In some embodiments, the communication unit 106 is configured to transmit the weight data detected by the one or more force sensors 302 periodically and/or based upon a schedule. Alternatively or additionally, the communication unit 106 is configured to transmit the weight data detected by the one or more force sensors 302 based upon a user-input command and/or in response to a query (e.g., data fetch instruction/request) from the LCS controller 204, which may be transmitted from the LCS controller 204 to the communication unit 106 via the data gateway device 206.

Figure 4A:
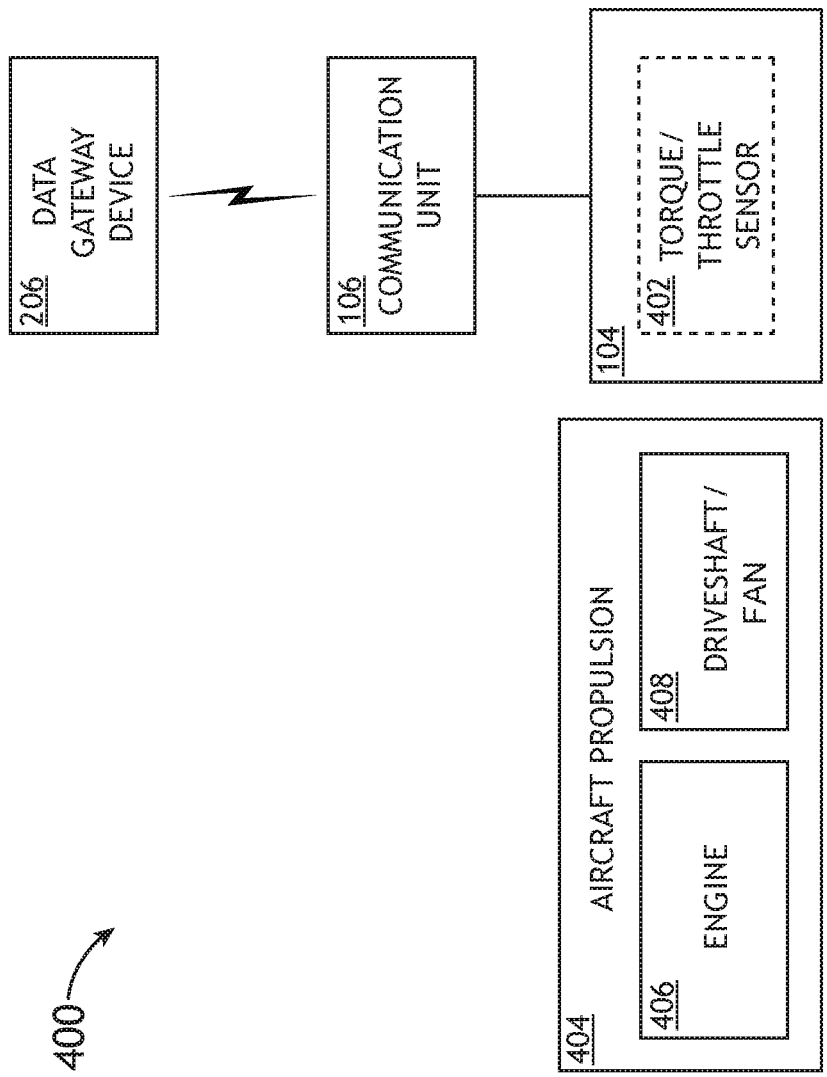
FIG. 4A is a block diagram illustrating a sensor configuration of the aircraft cargo handling system illustrated in FIG. 1, including one or more torque/throttle sensors, in accordance with example embodiments of this disclosure.
Figure 4B:
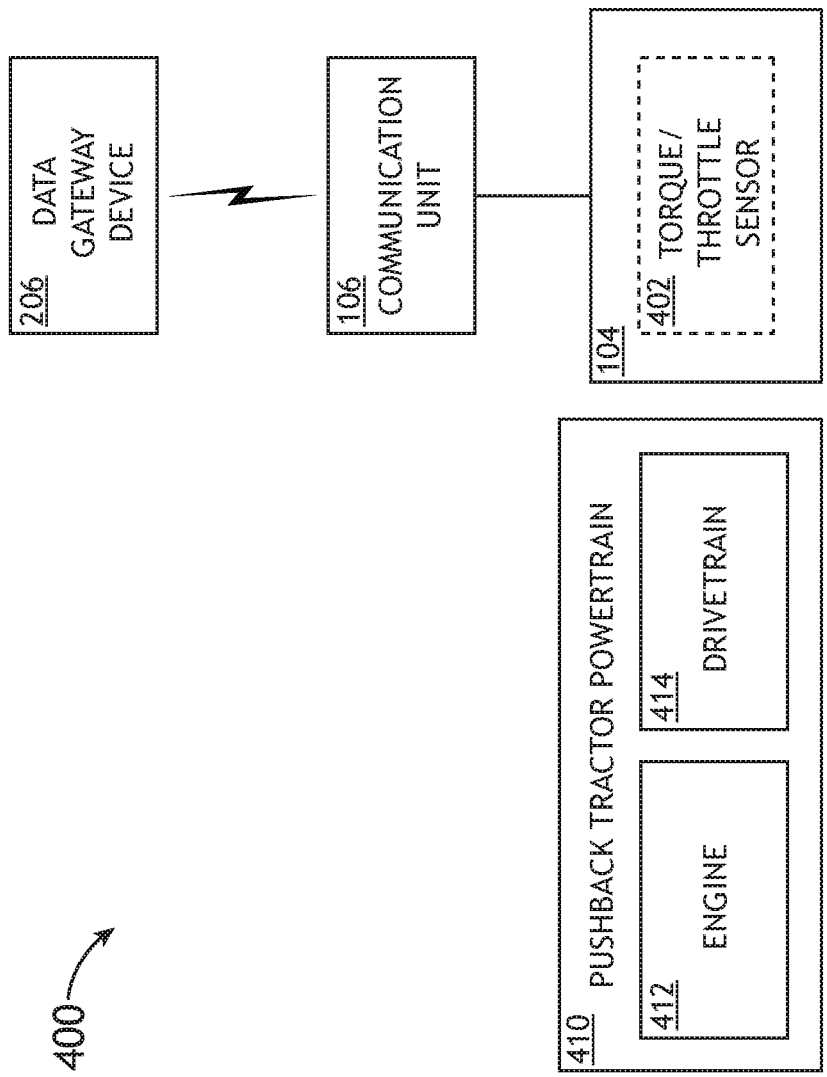
FIG. 4B is a block diagram illustrating a sensor configuration of the aircraft cargo handling system illustrated in FIG. 1, including one or more torque/throttle sensors, in accordance with example embodiments of this disclosure.

In some embodiments, the system 100 may include a sensor configuration 400 illustrated in FIG. 4A or 4B. In this regard, the one or more sensors 104 may include one or more torque/throttle sensors 402 configured to measure the torque/throttle that is required to roll the loaded aircraft 101. The torque/throttle may be measured from the engine parameters of a pushback tractor (sometimes referred to as a "tug") or the aircraft 101. The aircraft roll on ground can be performed with and without the cargo loads with torque/throttle being measured each time. The difference in the torques, referred to as Net Torque=Gross Torque−Tare Torque. By applying a common factor or by using a look-up table, the Net weight can be determined from the Net Torque. A similar operation may be performed with throttle measurements as well. Accordingly, one or more torque/throttle sensors 402 can be configured to detect a change in torque or throttle required to propel the aircraft 101 carrying the cargo units 102 on ground. In some embodiments (e.g., in FIG. 4A), to detect the torque/throttle parameters, the one or more torque/throttle sensors 402 may be coupled to a propulsion system 404 (e.g., to the engine 406 and/or driveshaft/fan 408) of the aircraft 101 that propels the aircraft 101 on ground. In other embodiments (e.g., in FIG. 4B), the one or more torque/throttle sensors 402 may be coupled to a powertrain 410 (e.g., to the engine 412 and/or drivetrain 414) of a pushback tractor/tug configured to pull the aircraft 101.

A communication unit 106 (including a transmitter/transceiver) is coupled to each torque/throttle sensor 402 or group of torque/throttle sensors 402 and is configured to transmit the detected weight data (e.g., the torque/throttle or detected change in torque/throttle) for the one or more cargo units 102 to the data gateway device 206. The data gateway device 206 then transmits the weight data detected by the one or more torque/throttle sensors 402 to the LCS controller 204. In some embodiments, the communication unit 106 is configured to transmit the weight data detected by the one or more torque/throttle sensors 402 periodically and/or based upon a schedule. Alternatively or additionally, the communication unit 106 is configured to transmit the weight data detected by the one or more force torque/throttle sensors 402 based upon a user-input command and/or in response to a query (e.g., data fetch instruction/request) from the LCS controller 204, which may be transmitted from the LCS controller 204 to the communication unit 106 via the data gateway device 206.

Figure 5:
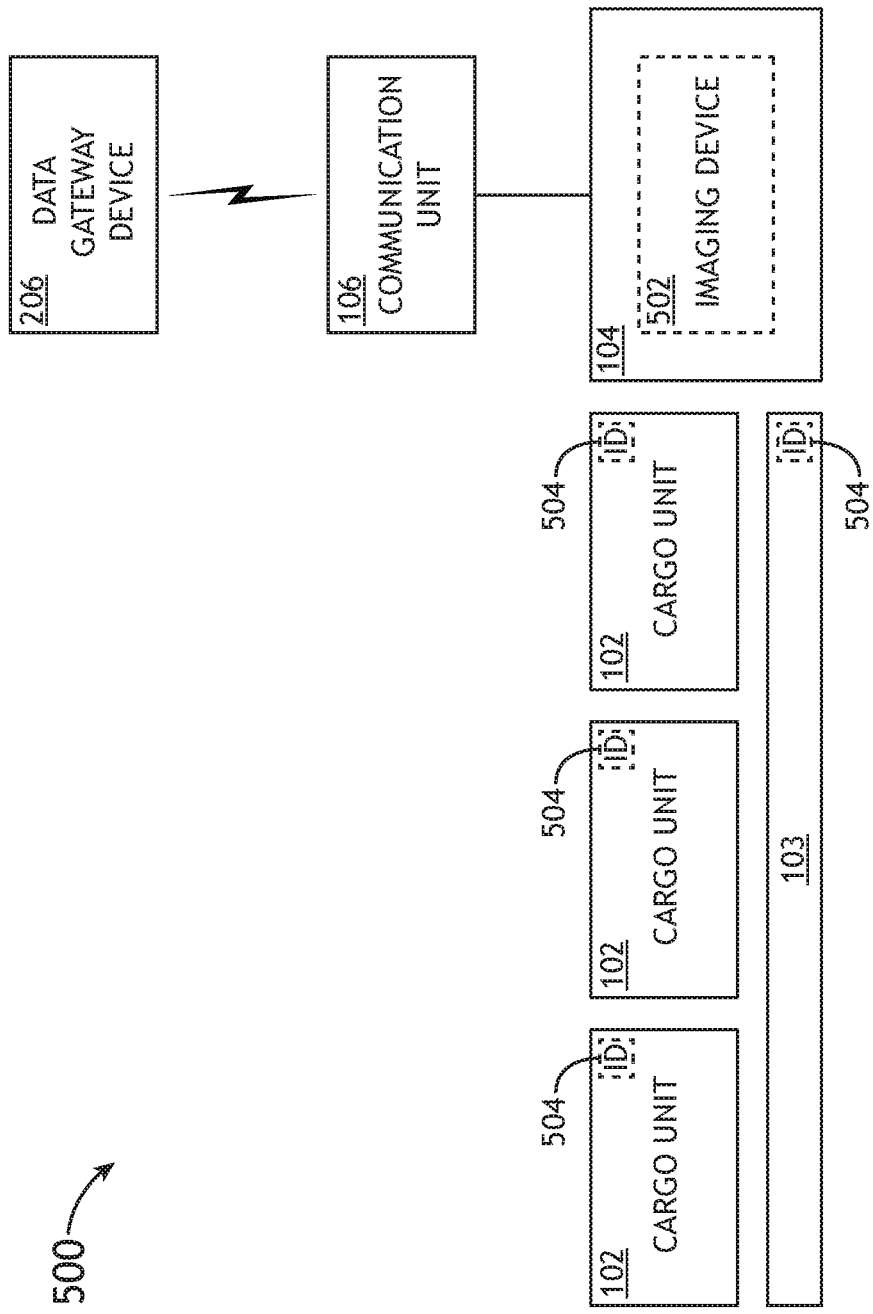
FIG. 5 is a block diagram illustrating a sensor configuration of the aircraft cargo handling system illustrated in FIG. 1, including one or more imaging devices, in accordance with example embodiments of this disclosure.

In some embodiments, the system 100 may include a sensor configuration 500 illustrated in FIG. 5. In this regard, the one or more sensors 104 may include one or more imaging devices (e.g., scanners, camera, or the like) configured to detect identifiers 504 (e.g., barcodes, QR codes, patterns, images, text, symbols, etc.) associated with predetermined weights of the cargo units 102. For example, the weight of a cargo unit 102 may be detected or predetermined ahead of time and then stored in a look up table or database. The predetermined weight of the cargo unit 102 can be associated with an identifier 504 that is coupled to (e.g., attached to or printed on) the cargo unit 102 and/or a carrier 103 for one or more cargo units 102. The weight data can then be retrieved for use based on detection of the identifier 504 (e.g., using the look up table, database, etc.). In some embodiments, the identifier 504 itself includes or is encoded with the weight data.

A communication unit 106 (including a transmitter/transceiver) is coupled to an imaging device 502 and is configured to transmit the detected weight data (e.g., identifier 504 information) for the one or more cargo units 102 to the data gateway device 206. The data gateway device 206 then transmits the weight data detected by the imaging device 502 to the LCS controller 204. In some embodiments, the communication unit 106 is configured to transmit the weight data detected by the imaging device 502 periodically and/or based upon a schedule. Alternatively or additionally, the communication unit 106 is configured to transmit the weight data detected by the imaging device 502 based upon a user-input command and/or in response to a query (e.g., data fetch instruction/request) from the LCS controller 204, which may be transmitted from the LCS controller 204 to the communication unit 106 via the data gateway device 206. In some embodiments, the LCS controller 204 is configured to determine weight data for the cargo units 102 based on the detected identifier 504 and a look up table or database with predetermined weight data associated with the identifier 504. In other embodiments, the LCS controller 204 is configured to determine the detected weight data based on weight data included (e.g., embedded or encoded) in the detected identifier 504 itself.

Figure 6:
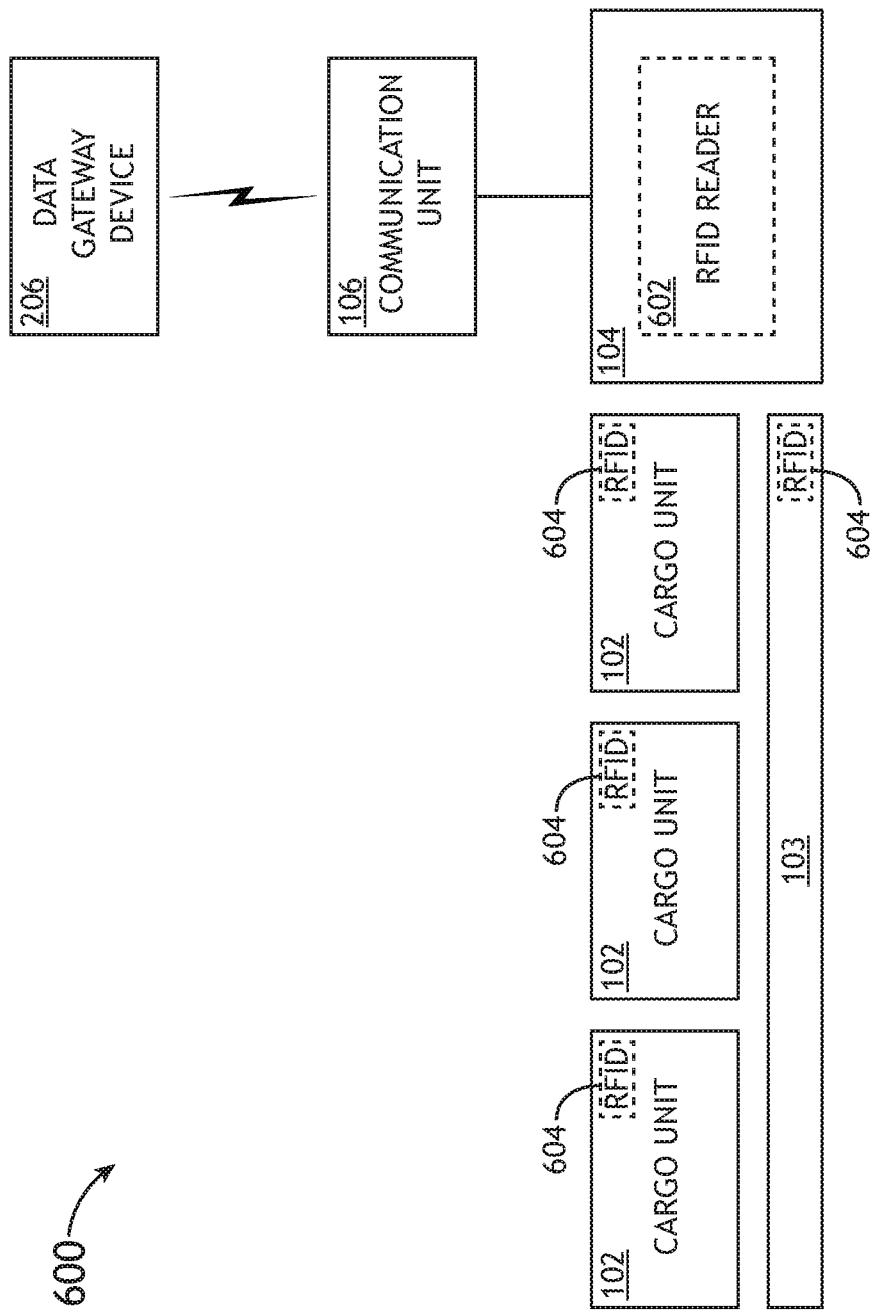
FIG. 6 is a block diagram illustrating a sensor configuration of the aircraft cargo handling system illustrated in FIG. 1, including one or more radio frequency identification (RFID) readers, in accordance with example embodiments of this disclosure.

In some embodiments, the system 100 may include a sensor configuration 600 illustrated in FIG. 6. In this regard, the one or more sensors 104 may include one or more RF sensors 602 (e.g., RFID readers) configured to detect identifiers 604 (e.g., RFID tags) associated with predetermined weights of the cargo units 102. For example, the weight of a cargo unit 102 may be detected or predetermined ahead of time and then stored in a look up table or database. The predetermined weight of the cargo unit 102 can be associated with an identifier 604 that is coupled to (e.g., attached to) the cargo unit 102 and/or a carrier 103 for one or more cargo units 102. The weight data can then be retrieved for use based on detection of the identifier 604 (e.g., using the look up table, database, etc.). In some embodiments, the identifier 604 itself is encoded with the weight data.

A communication unit 106 (including a transmitter/transceiver) is coupled to a RF sensor 602 and is configured to transmit the detected weight data (e.g., identifier 604 information) for the one or more cargo units 102 to the data gateway device 206. The data gateway device 206 then transmits the weight data detected by the RF sensor 602 to the LCS controller 204. In some embodiments, the communication unit 106 is configured to transmit the weight data detected by the RF sensor 602 periodically and/or based upon a schedule. Alternatively or additionally, the communication unit 106 is configured to transmit the weight data detected by the RF sensor 602 based upon a user-input command and/or in response to a query (e.g., data fetch instruction/request) from the LCS controller 204, which may be transmitted from the LCS controller 204 to the communication unit 106 via the data gateway device 206. In some embodiments, the LCS controller 204 is configured to determine weight data for the cargo units 102 based on the detected identifier 604 and a look up table or database with predetermined weight data associated with the identifier 604. In other embodiments, the LCS controller 204 is configured to determine the detected weight data based on weight data included (e.g., encoded) in the detected identifier 604 itself.

Using any of the sensor configurations (e.g., 300, 400, 500, or 600) or any combination of the sensor configurations described above, the LCS controller 204 is configured to receive detected weight data for the cargo units 102 and perform a comparison between the detected weight data and the user-input weight data. As previously noted, the LCS controller 204 can be configured to generate an alert (e.g., an audible or visible alert via the user interface 202) when the difference between the user-input weight data and the detected weight data is greater than a threshold weight difference. For example, the LCS controller 204 may provide an indication, via the user interface 202, that one or more of the cargo units 102 are heavier or lighter than their user-input weights. This may prompt aircraft crew and/or cargo handlers to weigh the flagged cargo units 102 again and re-enter their weights. In some embodiments, the LCS controller 204 is further configured to generate a cargo weight verification signal when the difference between the user-input weight data and the detected weight data is less than the threshold weight difference. For example, the LCS controller 204 may provide an indication, via the user interface 202, that one or more of the cargo units 102 are equal to or within an acceptable error tolerance of their user-input weights.

Figure 7:
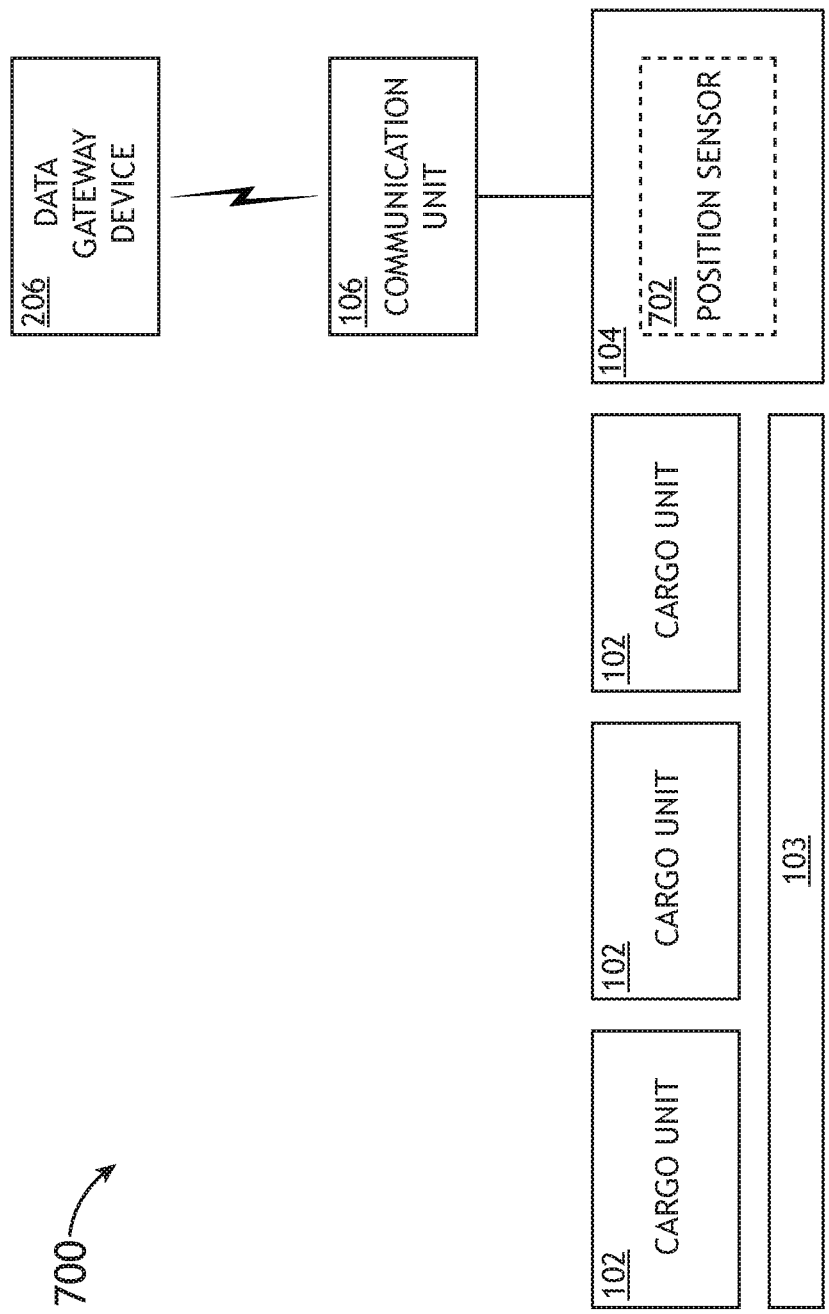
FIG. 7 is a block diagram illustrating a sensor configuration of the aircraft cargo handling system illustrated in FIG. 1, including one or more position sensors, in accordance with example embodiments of this disclosure.

In some embodiments, the system 100 may further include a sensor configuration 700 illustrated in FIG. 7. In this regard, the one or more sensors 104 may include one or more position sensors 702 (e.g., GPS receivers, inertial navigation sensors, RF transceivers, etc.) configured to detect position of one or more cargo units 102. For example, the one or more position sensors 702 may be coupled to the one or more cargo units 102 (e.g., disposed within or attached to each cargo unit 102). Alternatively, the one or more position sensors 702 may be coupled to one or more carriers 103 for the one or more cargo units 102.

A communication unit 106 (including a transmitter/transceiver) is coupled to a position sensor 702 and is configured to transmit the detected position data for one or more cargo units 102 and/or a carrier 103 for one or more cargo units 102 to the data gateway device 206. The data gateway device 206 then transmits the position data detected by the position sensor 702 to the LCS controller 204. In some embodiments, the communication unit 106 is configured to transmit the position data detected by the position sensor 702 periodically and/or based upon a schedule. Alternatively or additionally, the communication unit 106 is configured to transmit the position data detected by the position sensor 702 based upon a user-input command and/or in response to a query (e.g., data fetch instruction/request) from the LCS controller 204, which may be transmitted from the LCS controller 204 to the communication unit 106 via the data gateway device 206.

In this manner, the LCS controller 204 can monitor location of the cargo units 102 and/or a carrier 103 for one or more cargo units 102 in addition to monitoring weight. For example, the LCS controller 204 may be configured to monitor whether cargo units 102 are loaded onto or unloaded/released from the aircraft 101 and update the detected weight data and/or user-input weight data for the cargo units 102 accordingly. In this regard, the LCS controller 204 may be configured to receive the detected position data from one or more position sensors 702 (via the data gateway device 206) and may be further configured to update the user-input weight data and/or the detected weight data based on the detected position data for the one or more cargo units 102. For instance, if the detected position data indicates a cargo unit 102 is on the aircraft 101, the controller 204 can include the detected and/or user-input weight data for the cargo unit 102 in the detected and/or user-input weight totals. Conversely, if the detected position data indicates a cargo unit 102 is not on the aircraft 101, the controller 204 can exclude the detected and/or user-input weight data for the cargo unit 102 in the detected and/or user-input weight totals. The LCS controller 204 may be further configured to monitor position data for one or more cargo units 102 and/or a carrier 103 for one or more cargo units 102 to keep track of drop locations, on-ground or on-aircraft location/movement of cargo, post-drop movement of cargo, and so forth. The memory 214 is used for storing all weight/position data (about cargo units 102 and/or a carrier 103 for one or more cargo units 102) that transit via the gateway device. The gateway can keep gathering this data log as long as it is able to be connected (wired/wirelessly) with the communication unit 106. The data stored in memory 214 can be retrieved for analysis/analytics to aid in improving the accuracy and precision of cargo drops.

Figure 8A:
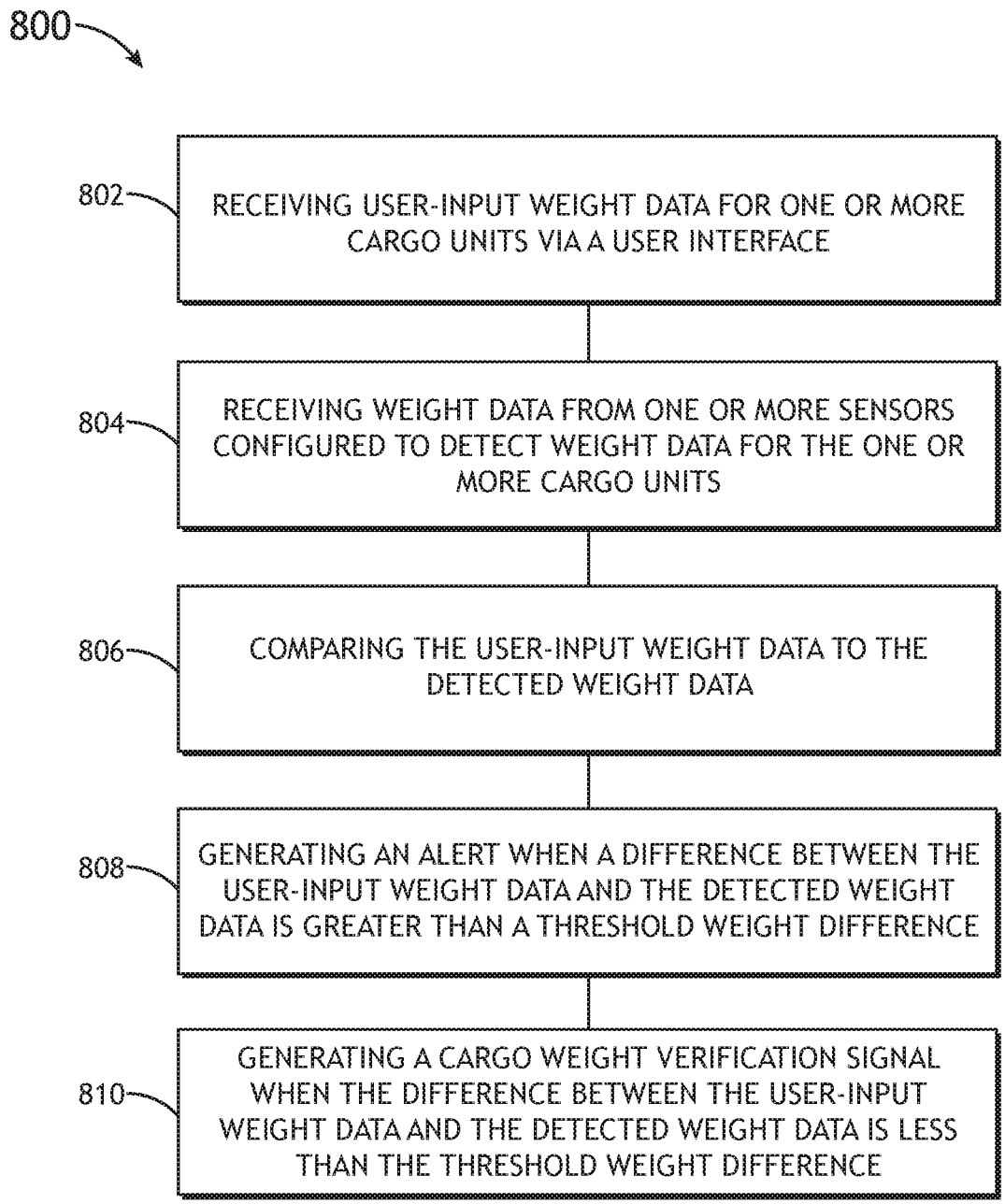
FIG. 8A is a flow diagram illustrating an example implementation of a method for monitoring aircraft cargo with a system, such as the aircraft cargo handling system illustrated in any of FIGS. 1 through 7, or a combination thereof.
Figure 8B:
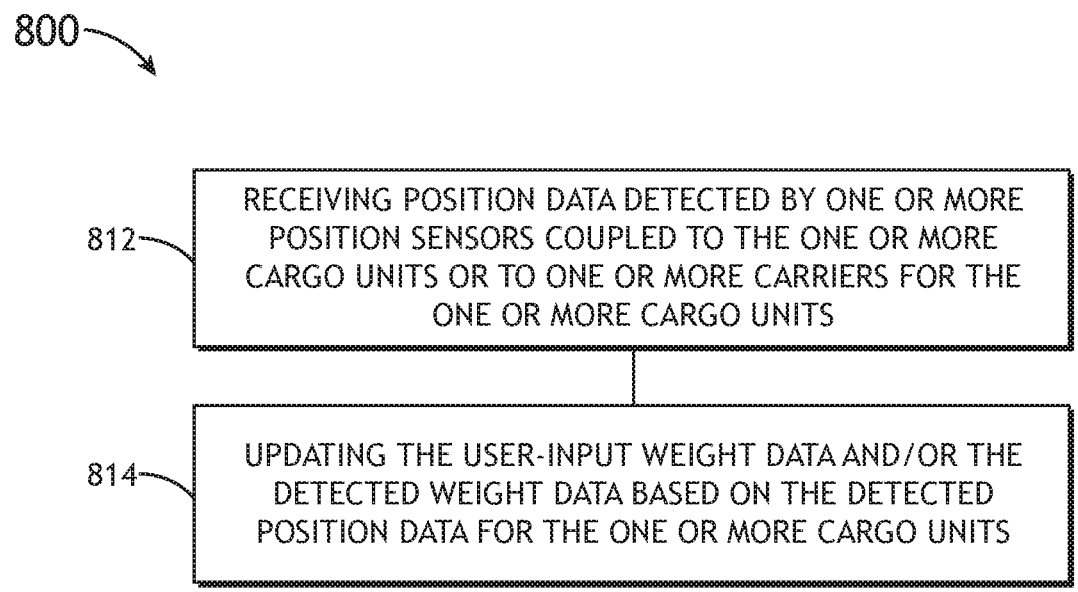
FIG. 8B is a flow diagram illustrating additional steps of the method of FIG. 8A, in accordance with example implementations of this disclosure.

FIGS. 8A and 8B illustrate example implementations of a method 800 that employs the aircraft cargo handling system 100 described herein. In general, operations of disclosed processes (e.g., method 800) may be performed in an arbitrary order, unless otherwise provided in the claims.

As shown in FIG. 8A, at step 802, the method 800 includes receiving user-input weight data for one or more cargo units 102. For example, the LCS controller 204 may receive user-input weight data via the user interface 202, or the weight data may be uploaded from a server or another device (e.g., from a CHPS or by interfacing with a Mission Computer).

At step 804, the method 800 includes receiving weight data from one or more sensors 104 configured to detect weight data for the one or more cargo units 102. For example, the LCS controller 204 may receive weight data for the one or more cargo units 102 detected by one or more sensors 104 that can include, but are not limited to, force sensors 302, torque/throttle sensors 402, imaging devices 502, and/or RF sensors 602.

At step 806, the method 800 includes comparing the user-input weight data to the detected weight data. For example, using any of the sensor configurations (e.g., 300, 400, 500, or 600) or any combination of the sensor configurations described above, the LCS controller 204 can receive detected weight data for the cargo units 102 and perform a comparison between the detected weight data and the user-input weight data.

At step 808, the method 800 includes generating an alert when a difference between the user-input weight data and the detected weight data is greater than a threshold weight difference. For example, the LCS controller 204 can generate an alert (e.g., an audible or visible alert via the user interface 202) when the difference between the user-input weight data and the detected weight data is greater than a threshold weight difference.

In some implementations, the method 800 further includes a step 810 of generating a cargo weight verification signal when the difference between the user-input weight data and the detected weight data is less than the threshold weight difference. For example, the LCS controller 204 can generate a cargo weight verification signal when the difference between the user-input weight data and the detected weight data is less than the threshold weight difference.

Referring now to FIG. 8B, in some implementations, the method 800 further includes a step 812 of receiving position data detected by one or more position sensors 702 coupled to the one or more cargo units 102 or to one or more carriers 103 for the one or more cargo units 102. For example, the LCS controller 204 can receive position data transmitted by the position sensors 702 (e.g., via respective communication units 106) through the data gateway device 206.

In some implementations, the method 800 further includes a step 814 of updating the user-input weight data and/or the detected weight data based on the detected position data for the one or more cargo units 102 and/or a carrier 103 for one or more of cargo units 102. For example, if the detected position data indicates a cargo unit 102 is on the aircraft 101, the controller 204 can include the detected and/or user-input weight data for the cargo unit 102 in the detected and/or user-input weight totals. Conversely, if the detected position data indicates a cargo unit 102 is not on the aircraft 101, the controller 204 can exclude the detected and/or user-input weight data for the cargo unit 102 in the detected and/or user-input weight totals.

The method 800 may further include any step or operation implied or required by the embodiments of the aircraft cargo handling system 100 described herein. The aircraft cargo handling system 100 can also include any additional component or functionality expressed or implied by the method 800.

It is to be understood that implementations of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some implementations, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An aircraft cargo handling system, comprising:
a loadmaster control station including a controller;
a user interface communicatively coupled to the controller and configured to receive user-input weight data for one or more cargo units or one or more carriers for the one or more cargo units;
one or more sensors configured to detect weight data for the one or more cargo units; and one or more transmitters coupled to the one or more sensors and configured to transmit the detected weight data to a data gateway device communicatively coupled to the controller, wherein the controller is configured to:
receive the user-input weight data from the user interface;
receive the detected weight data from the data gateway device;
compare the user-input weight data to the detected weight data; and
generate an alert when a difference between the user-input weight data and the detected weight data is greater than a threshold weight difference.

2. The aircraft cargo handling system of claim 1, wherein the one or more sensors include one or more force sensors configured to detect one or more weights associated with the one or more cargo units or the one or more carriers for the one or more cargo units.

3. The aircraft cargo handling system of claim 2, wherein the one or more force sensors are coupled to the one or more cargo units or to the one or more carriers for the one or more cargo units.

4. The aircraft cargo handling system of claim 1, wherein the one or more sensors include one or more torque or throttle sensors configured to detect a change in torque or throttle required to propel an aircraft carrying the one or more cargo units.

5. The aircraft cargo handling system of claim 4, wherein the one or more torque or throttle sensors are coupled to a propulsion system of the aircraft.

6. The aircraft cargo handling system of claim 4, wherein the one or more torque or throttle sensors are coupled to a powertrain of a pushback tractor configured to pull the aircraft.

7. The aircraft cargo handling system of claim 1, wherein the one or more sensors include one or more imaging devices or radio frequency identification (RFID) readers configured to detect one or more identifiers associated with one or more predetermined weights of the one or more cargo units or the one or more carriers for the one or more cargo units.

8. The aircraft cargo handling system of claim 7, wherein the one or more identifiers are coupled to the one or more cargo units or to the one or more carriers for the one or more cargo units.

9. The aircraft cargo handling system of claim 1, wherein the controller is further configured to:
generate a cargo weight verification signal when the difference between the user-input weight data and the detected weight data is less than the threshold weight difference.

10. The aircraft cargo handling system of claim 1, further comprising:
one or more position sensors configured to detect position data for the one or more cargo units or the one or more carriers for the one or more cargo units, wherein the one or more transmitters are coupled to the one or more position sensors and configured to transmit the detected position data to the data gateway device.

11. The aircraft cargo handling system of claim 10, wherein the one or more position sensors are coupled to the one or more cargo units or to the one or more carriers for the one or more cargo units.

12. The aircraft cargo handling system of claim 10, wherein the controller is further configured to:
receive the detected position data from the data gateway device; and
update at least one of the user-input weight data or the detected weight data based on the detected position data for the one or more cargo units or the one or more carriers for the one or more cargo units.

13. A loadmaster control station, comprising:
a controller;
a user interface communicatively coupled to the controller and configured to receive user-input weight data for one or more cargo units or one or more carriers for the one or more cargo units;
a data gateway device communicatively coupled to the controller, the data gateway device configured to receive weight data detected by one or more sensors coupled to the one or more cargo units or to one or more carriers for the one or more cargo units;
wherein the controller is configured to:
receive the user-input weight data from the user interface;
receive the detected weight data from the data gateway device;
compare the user-input weight data to the detected weight data; and
generate an alert when a difference between the user-input weight data and the detected weight data is greater than a threshold weight difference.

14. The loadmaster control station of claim 13, wherein the controller is further configured to:
generate a cargo weight verification signal when the difference between the user-input weight data and the detected weight data is less than the threshold weight difference.

15. The loadmaster control station of claim 13, wherein the data gateway device is further configured to receive position data detected by one or more position sensors coupled to the one or more cargo units or to the one or more carriers for the one or more cargo units.

16. The loadmaster control station of claim 15, wherein the controller is further configured to:
receive the detected position data from the data gateway device; and
update at least one of the user-input weight data or the detected weight data based on the detected position data for the one or more cargo units or the one or more carriers for the one or more cargo units.

17. A method of monitoring aircraft cargo, comprising:
receiving user-input weight data for one or more cargo units via a user interface;
receiving weight data detected by one or more sensors coupled to the one or more cargo units or to one or more carriers for the one or more cargo units;
comparing the user-input weight data to the detected weight data; and
generating an alert when a difference between the user-input weight data and the detected weight data is greater than a threshold weight difference.

18. The method of claim 17, further comprising:
generating a cargo weight verification signal when the difference between the user-input weight data and the detected weight data is less than the threshold weight difference.

19. The method of claim 17, further comprising:
receiving position data detected by one or more position sensors coupled to the one or more cargo units or to the one or more carriers for the one or more cargo units.

20. The method of claim 19, further comprising:
updating at least one of the user-input weight data or the detected weight data based on the detected position data for the one or more cargo units or the one or more carriers for the one or more cargo units.

* * * * *